May 28, 1929.  D. C. WOODERSON  1,714,536
OVEN
Filed Nov. 3, 1928   2 Sheets-Sheet 1

Delbert C. Wooderson.
INVENTOR
BY *Victor J. Evans*
ATTORNEY

May 28, 1929. D. C. WOODERSON 1,714,536
OVEN
Filed Nov. 3, 1928   2 Sheets-Sheet 2
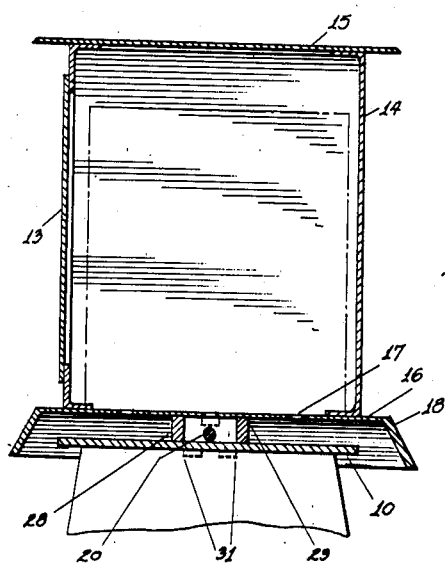
Fig. 3.
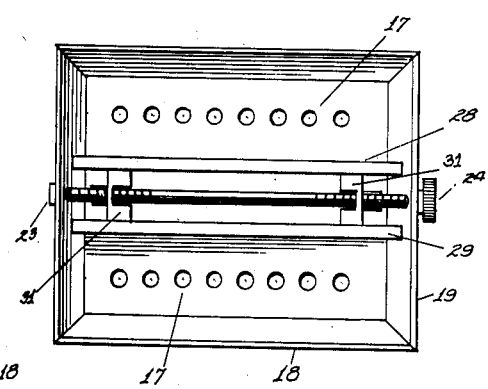
Fig. 4.
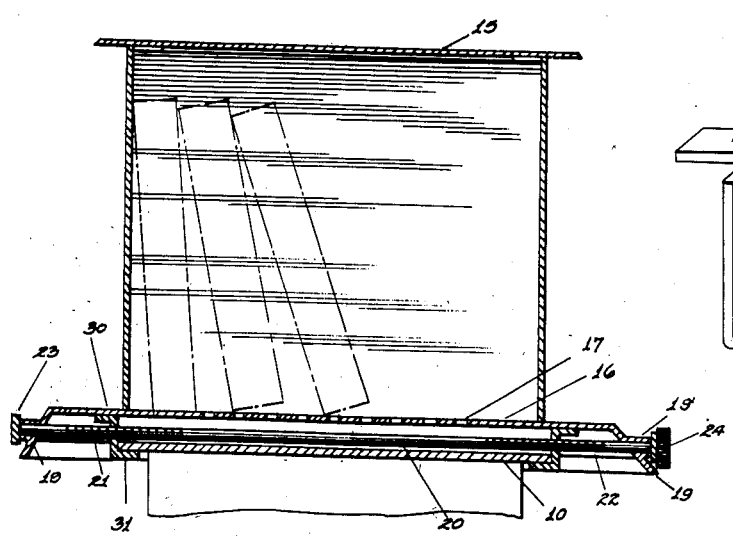
Fig. 5.
Fig. 6.
Delbert C. Wooderson.
INVENTOR
BY Victor J. Evans
ATTORNEY Patented May 28, 1929.

1,714,536

UNITED STATES PATENT OFFICE.

DELBERT C. WOODERSON, OF WALLIS, TEXAS.

OVEN.

Application filed November 3, 1928. Serial No. 316,961.

The object of this invention is to provide an oven for an electric toaster, and designed to receive a number of slices of toast as they are removed from the toaster itself, the slices accumulating being kept in the freshly toasted condition in which they leave that part of the device where they are subjected to dry heat, so that it is possible to make at one time a quantity sufficient for several people, the operation being completed if desired before the meal is begun.

A further object is to provide an oven and special means for securing the latter to the upper portion of a toaster of standard type, the oven being heated at the time the toast is being prepared, and by the same energized unit or units, and this oven retaining its heat after the current is turned off, for a length of time sufficient for the purpose disclosed.

With the foregoing and other objects in view, the invention consists in the novel construction and arrangement of elements described, illustrated and claimed, it being understood that modifications may be made within the scope of the claims without departing from the spirit of the invention.

In the drawings forming part of this application:—

Figure 3 shows the oven in vertical section, also showing the upper element of the toaster, and the spacing means between which the clamps operate.

Figure 4 is a bottom plan view of the oven.

Figure 5 is a perspective view of one of the clamping devices adapted to engage the top of the toaster.

Figure 6 is a view of the oven in vertical section, and in a plane at an angle with the plane of the section of Figure 3.

Figure 1:
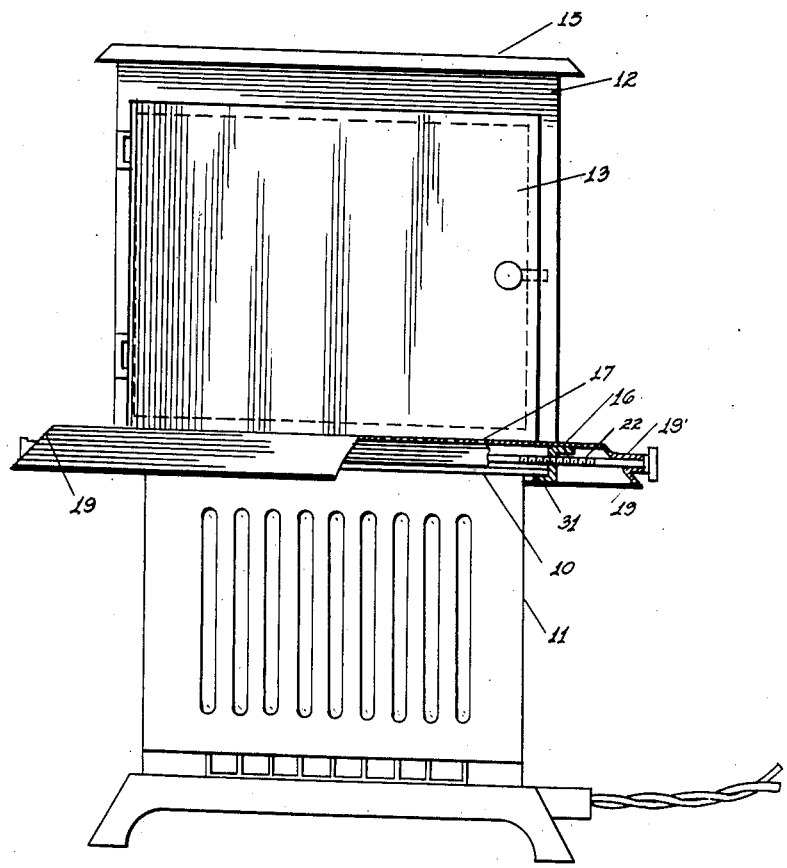
Figure 1 is a view chiefly in front elevation showing the oven as applied to a toaster of a well known type.
Figure 2:
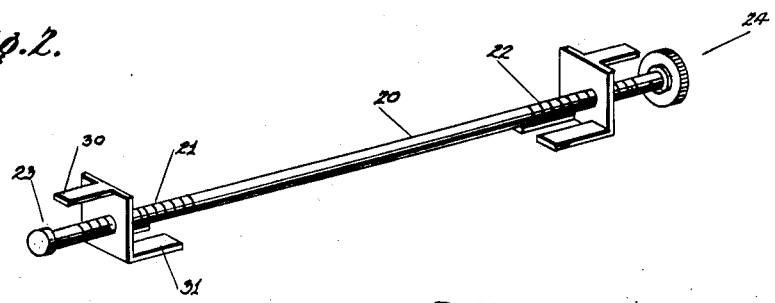
Figure 2 is a perspective view of the clamping means by the use of which the oven is secured to the top of the toaster, the threaded rod passing thru the flanged base of the oven.

The toaster includes the top 10 and the swinging element 11 of usual type, and on this top 10 the oven is to be mounted and secured by the special devices herein described. The oven includes a front portion 12, a door 13 and a rear wall 14, the top being designated 15. The bottom of the oven designated 16 is apertured as shown at 17 and projects laterally as indicated in Figure 3, with reference to the vertical walls of the oven. The bottom 16 is also provided with downwardly extending flanged portions 18, and the extending flanges 19 are apertured and provided with apertured extensions if desired as shown at 19'.

A rod 20 is threaded in reverse directions at the points 21 and 22, and said rod passes thru the portions 19', and end members for permitting rotation of the rod are designated 23 and 24.

An important feature is found in the clamping devices of the type shown in Figure 5, these devices being reversely threaded at the central portions 25, and the vertical portions of the clamping elements, or the central portions 26 of the clamping elements are adapted to move across the bottom, between parallel bars or elements 28 and 29, acting as guides, these devices being secured at their ends in any suitable manner and connected if desired with the end flanges.

The clamping devices of Figure 5 each include an upper tongue such as 30 extending laterally, and also spaced tongues 31 projecting laterally in the opposite direction. The tongues 31 are adapted to engage the under side of the top 10 of the toaster, and the upper tongue 30 engages the lower surfaces of the bottom 17 of the oven, and these contacting surfaces last named are relatively slidable. Provision is thereby made for attaching the oven to toasters having tops varying in size, and the oven may be applied or detached without loss of time. As previously indicated the slices of toasted bread are to accumulate within the oven while the toast is being prepared and while the current is energizing the customary heating unit. The oven will then remain warm for a considerable period, or until the operation of preparing the toast has been completed.

Having described the invention what is claimed is:

1. In an oven, a plurality of side walls and a top, a bottom including downwardly extending portions, devices extending below the bottom and adapted to support the bottom of the oven on the top of a toaster, a threaded rod passing thru and engaging the downwardly extending portions of the bottom, clamping members oppositely threaded and adapted for cooperation with the rod, portions of which have threads extending in reverse relation, and the clamping members being adapted to engage the underside of the top of the toaster.

2. In an oven, a plurality of side walls and a top, a bottom including downwardly extending portions, devices extending below the bottom and adapted to support the bottom of the oven on the top of a toaster, a threaded rod passing thru and engaging downwardly extending portions of the bottom, clamping members oppositely threaded and adapted for cooperation with the rod, said clamping members including tongues extending in opposite directions and contacting respectively with the bottom of the oven and the top of the toaster, portions of the rod having threads extending in reverse relation.

3. In an oven, a plurality of side walls and a top, a bottom including downwardly extending flanges, the bottom being apertured for the passage of heat, guides extending across the bottom on the under side thereof and adapted to support the bottom of the oven, a threaded rod passing thru and engaging the flanges of the oven bottom, clamping members operating between the guides and oppositely threaded for engagement by the threaded rod.

In testimony whereof I affix my signature.

DELBERT C. WOODERSON